United States Patent [19]

Raugh et al.

[11] 3,946,533

[45] Mar. 30, 1976

[54] TORSION RESISTANT GIRDER

[75] Inventors: Donald D. Raugh, Grosse Ile; Larry C. Jones, Allen Park, both of Mich.

[73] Assignee: National Steel Corporation, Pittsburgh, Pa.

[22] Filed: Oct. 2, 1973

[21] Appl. No.: 402,775

[52] U.S. Cl. .................... 52/729; 52/730; 29/155 R
[51] Int. Cl.$^{2}$ ..................... E04C 3/30; B23P 17/00
[58] Field of Search ............................ 52/731–732, 52/729, 730, 758 B; 29/155 R

[56] References Cited

UNITED STATES PATENTS

| | | | |
|---|---|---|---|
| 665,718 | 1/1901 | Armstrong | 52/731 |
| 804,598 | 11/1905 | Hancox | 52/732 |
| 879,750 | 2/1908 | Dippel et al. | 104/124 |
| 1,039,137 | 12/1912 | Johnson | 52/758 B |
| 1,360,720 | 11/1920 | Brown et al. | 52/729 |
| 1,421,280 | 6/1922 | Mayrow | 52/730 |
| 1,526,198 | 2/1925 | Arnstein | 29/155 R |
| 1,933,430 | 10/1933 | Harry | 29/155 R |
| 2,058,537 | 10/1936 | Weiskopf et al. | 52/729 |
| 2,263,272 | 11/1941 | Moss | 52/729 |
| 2,376,574 | 5/1945 | Collins | 29/155 R |
| 2,448,362 | 8/1948 | Earhart | 52/729 |
| 3,335,674 | 8/1967 | Kore et al. | 104/98 |

FOREIGN PATENTS OR APPLICATIONS

| | | | |
|---|---|---|---|
| 35,601 | 10/1929 | France | 52/624 |
| 1,098,183 | 1/1961 | Germany | 52/748 B |
| 538,635 | 11/1931 | Germany | 29/155 R |
| 116,180 | 4/1946 | Sweden | 52/729 |

*Primary Examiner*—James L. Ridgill, Jr.
*Attorney, Agent, or Firm*—Shanley, O'Neil and Baker

[57] ABSTRACT

A torsion resistant girder for supporting a crane rail in which the rail is supported on the top chord and the web of the girder includes an upper marginal portion formed integrally with the top chord by rolling or extrusion and the remainder of the web is a thinner plate welded at its upper edge to the depending free edge of the portion of the web plate formed integrally with the top chord member. This construction is designed to prevent failure of the girder along the line of junction between the web and the top chord. The web stiffening plates of the girder include wing plates connected to the outer free edges of the web stiffening plates and to the top chord. The wing plates and the upper portion of the web plate stiffening plates may be formed integrally by rolling or extrusion.

4 Claims, 10 Drawing Figures

FIG.1
PRIOR ART
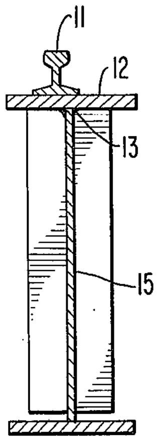
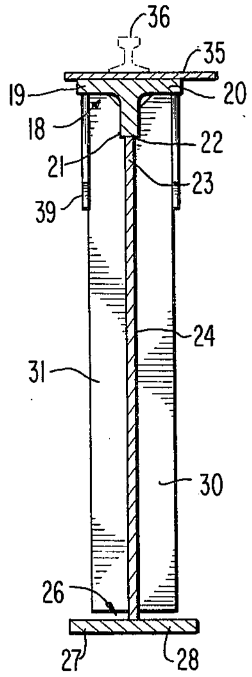
FIG.4
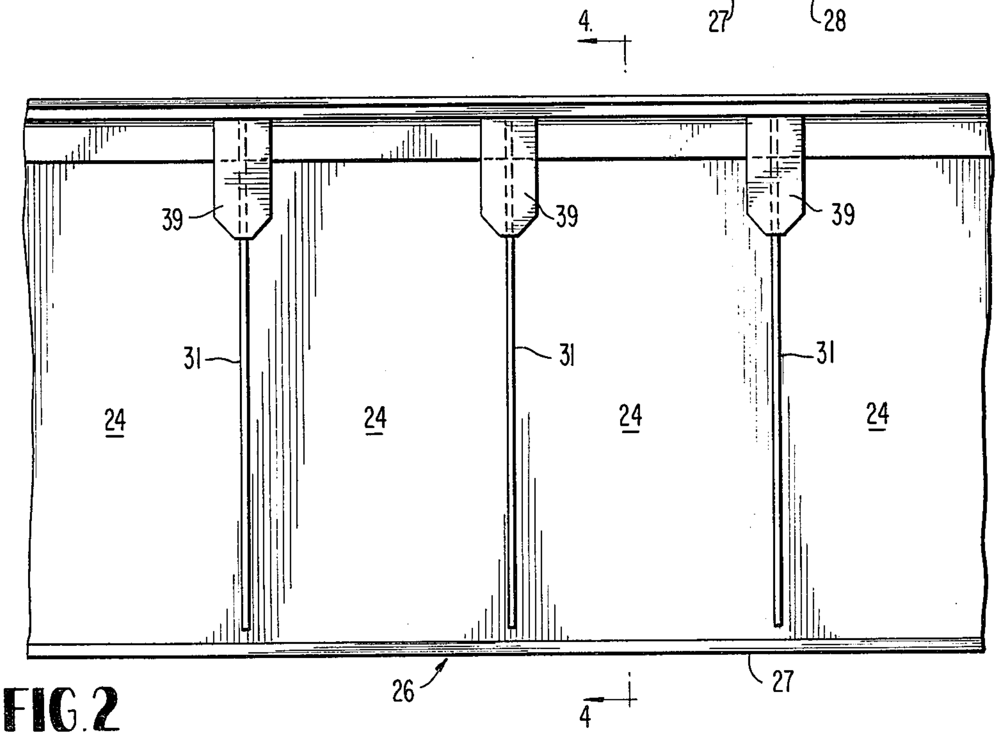
FIG.2
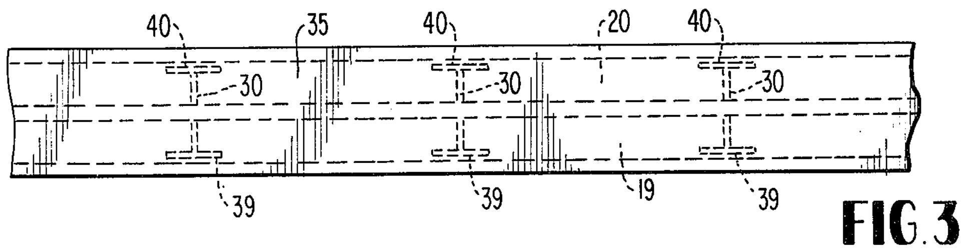
FIG.3

FIG.5
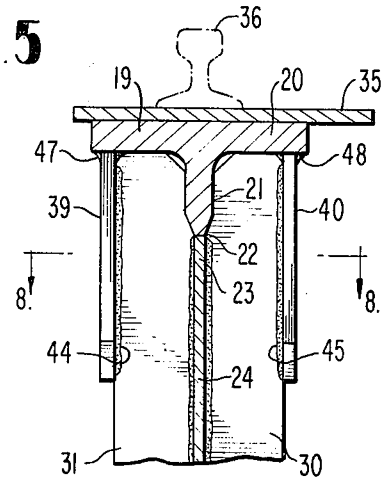
FIG.6
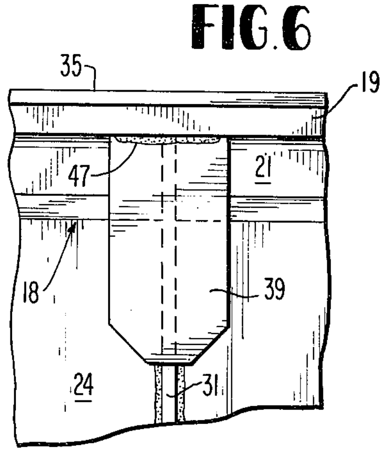
FIG.7
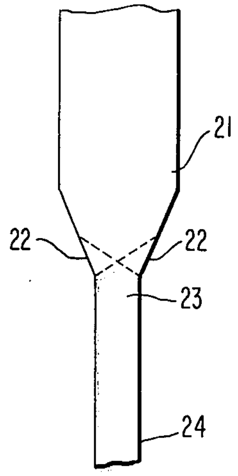
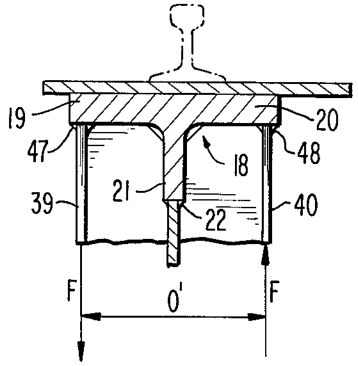
FIG.9
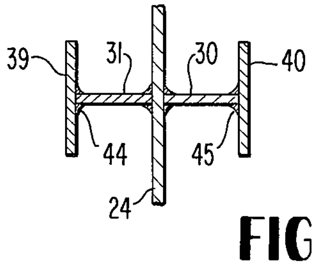
FIG.8
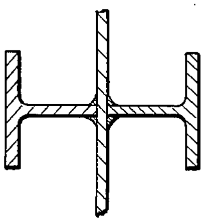
FIG.10

TORSION RESISTANT GIRDER

BACKGROUND OF THE INVENTION

In the case of a typical prior art welded crane girder, operation of the crane along the crane rail carried by the top chord of the girder results in torsion loads being applied to the chord. Due to the effects of metal fatigue from cyclic loading, these torsion loads eventually result in widespread fractures through or near the weld connecting the top chord and the web of the girder. These failures have become common in crane girders.

The present invention replaces the conventional top chord-to-web weld connection in the girder with a heavy rolled "tee," which can conveniently be half of a heavy column section. Use of the "tee" replaces the highly stressed "trouble spot" with a much larger area of rolled steel and at the same time eliminates the thermal problems and "stress raiser" effects of the weld itself. The web-to-flange shop weld is moved down the web a short distance to a much less critical location.

The present invention also includes the addition of "wing plates" welded to the conventional web stiffener plates with only the top of the wing plates shop welded to the flanges of the chord. This eliminates welds from a high stress area and greatly increases the resistance moments of the flanges of the chord.

BRIEF DESCRIPTION OF THE FIGURES OF THE DRAWINGS

FIG. 1 is a diagrammatic view in cross section of a conventional crane girder;

FIG. 2 is a side elevational view of a section of a crane girder incorporating the present invention;

FIG. 3 is a plan view of the same section of the crane girder incorporating the present invention;

FIG. 4 is a view in cross section taken on the line 4—4 on FIG. 2;

FIG. 5 is an enlarged view in cross section of the upper portion of the girder of FIG. 4;

FIG. 6 is an enlarged view in side elevation of the girder as shown in FIG. 5;

FIG. 7 is an enlarged view of a detail appearing in FIG. 5;

FIG. 8 is an enlarged view in horizontal section taken on the line 8—8 of FIG. 5;

FIG. 9 is a diagrammatic view similar to FIG. 5 illustrating the forces acting on the critical area of the crane girder of the present invention;

FIG. 10 is a view similar to FIG. 8 of a modification.

DETAILED DESCRIPTION OF AN EMBODIMENT OF THE INVENTION

FIG. 1 shows in cross section a typical welded crane girder section of the prior art with arrows H and V representing horizontal and vertical forces applied to the girder by the crane operations through the crane rail. The effect of torsion loads repeatedly applied to the top flange or chord 12 eventually results, due to metal fatigue brought on by the cyclic loading, in widespread fractures through or near the welds 13 which connect flange or chord 12 with the upper marginal portion of the web plate 15.

FIG. 4 is a view in cross section, similar to that of FIG. 1 but disclosing a crane girder constructed in accordance with the present invention. In this crane girder, the chord 12, weld 13 and upper margin 14 of the web plate 15 are replaced by a rolled or extruded tee section which can if desired by one-half of a rolled or extruded column section. Use of the tee section replaces the highly stressed trouble spot in the conventional girder with a much larger area of rolled or extruded metal and at the same time eliminates the thermal problems and "stress raiser" effects of the weld itself. Additionally, by using the rolled or extruded tee, the web-to-flange shop weld is moved down the web a short distance to a much less critical location.

Tee section 18 is made up of a chord portion comprising flanges 19 and 20 and a stem or web portion 21, web portion 21 in this description being taken to include the fillets between the web portion and the chord. Web portion 21 of the tee section presents a free edge and this free edge is welded at 22 to the upper margin 23 of web plate 24.

As in the case of conventional, prior art crane girders, the crane girder of the present invention has a bottom chord 26 presenting flanges 27 and 28, the lower marginal portion of web plate 24 being welded to chord 26. The present girder also has conventional interior stiffening plates 30 and 31 which are welded along their inner margins to the faces of the web plate but as explained below not to the tee section. Also present is the conventional top plate 37 and crane rail 36.

An important, although not necessarily essential, part of the present invention as structure resisting the torsional forces applied to the crane girder by the crane are wing plates 39, 40 which as shown best in FIGS. 5 and 6 have their inner faces welded to the outer margins of the interior web stiffeners 30 and 31 at 44 and 45 and their two edges welded to the underside of the chord flanges 19 and 20 at 47 and 48. A good strong connection between each wing plate and the chord is important and the upper edge of the wing plates are milled to fit snugly up against the chord undersurface before welding. It is to be noted that the web stiffeners 30 and 31 are not welded to the web of the tee nor to the undersides of flanges 19 and 20. In view of the tee structure the reinforcing effect of the interior stiffeners can be dispensed with at those locations and the stress raising effects of welds are thus eliminated in this critical area.

FIG. 7 is an enlarged view of the weld connection between the stem or web 21 of tee 18 and the upper marginal portion 23 of web plate 24, with the weld boundary shown in dotted lines. This view shows the relative proportions of the parts. With the web plate 24 being ⅝ths of an inch thick the tee stem can be 1-7/16th inches, thereby giving the indicated 5-to-12 slope of the tapered portion of the tee stem. The web plate can go down to much thinner gage, for example, ¼ of an inch and the tee stem can be reduced commensurately while still remaining relatively thick. The important factor here is that the tee stem or web portion of the tee, being short compared to the very deep web plate, the tee can economically be of very much heavier gage in this small but highly critical part of the girder cross section, namely the point where the web plate joins the chord. Additionally, there is the elimination of a weld at this critical point.

An example of the wing plate dimensions is a width of 9 inches, a length of 1 foot 6 inches and a thickness of ¾ths of an inch where the girder is about 7 feet deep. With smaller or larger girders these dimensions can obviously be reduced or increased, respectively.

As best shown in FIG. 9, the fact that the tops of stiffener plates 39 and 40 are welded at 47 and 48 to the undersides of chord flanges 19 and 20 makes it possible to eliminate all welds between the interior stiffener plates and the stem 21 of the tee thereby eliminating all welds from a high stress area while at the same time greatly increasing the resisting moment of the chord. This increased torsional resistant moment is shown as the couple F times 0' in FIG. 9. Thus the wing plates cooperate with and add to the effectiveness of the tee member by reducing the amount of strain applied at the critical area of the tee member.

Where the term "web" is used in the appended claims, the stem or web 21 of tee section 18 is included within the meaning of the term as applied to the preferred embodiment.

WING PLATE MODIFICATION

As shown in FIG. 10, if desired, the upper portions of the interior stiffener plates and the associated wing plates can be replaced by rolled or extruded tee shapes, with the lower margin of the tee shape welded to the upper margin of the remaining lower portion of the interior stiffener plate.

We claim:

1. In combination a crane rail and a built-up, welded metallic girder, the combination comprising a. a chord supporting the crane rail on the top side of the chord, the chord having longitudinal marginal portions, b. a web arranged below the chord having a longitudinal marginal portion disposed along a line intermediate the longitudinal margins of the chord, the web having an intermediate portion of uniform thickness contiguous to the marginal portion thereof, c. the marginal portion of the web being appreciably thicker than the contiguous intermediate portion of the web, the chord and the marginal portion of the web being integrally formed with fillets by rolling or extruding, the marginal portion of the web depending a substantial distance below the fillets and having a straight free edge contiguous to the intermediate portion of the web, and the intermediate portion of the web having a straight free edge contiguous to the free edge of the marginal portion of the web, d. a weld joining the free edge of the marginal portion of the web to the free edge of the intermediate portion of the web, e. a plurality of web stiffeners disposed along the length of the girder and arranged perpendicularly to the chord and to the web, one marginal portion of each web stiffener being contiguous to the web and connected to the intermediate portion of the web, f. there being no direct connection between each web stiffener and the marginal portion of the web nor between the web stiffener and the chord, and g. a wing plate connected to each web stiffener along a marginal portion of the web stiffener remote from the web, each wing plate having a marginal portion contiguous to and connected to the marginal portion of the chord, there being no other connection between the wing plate and the chord.

2. The structure claimed in claim 1 in which h. the marginal portion of the web contiguous to the chord is at least 50% thicker than the contiguous intermediate portion of the web.

3. The structure claimed in claim 1 in which g. the wing plate and the upper portion of the web stiffener are integrally formed by rolling or extruding.

4. The structure claimed in claim 3 in which h. the marginal portion of the web contiguous to the chord is at least 50% thicker than the contiguous intermediate portion of the web.

* * * * *

UNITED STATES PATENT OFFICE

CERTIFICATE OF CORRECTION

Patent No. 3,946,533 Dated March 30, 1976

Inventor(s) Donald D. Raugh, Larry C. Jones

It is certified that error appears in the above-identified patent and that said Letters Patent are hereby corrected as shown below:

Col. 2, line 14, after "section", insert -- extends an appreciable distance below the fillets and --;

line 15, cancel "and", insert a period (.); same line, change "this" to -- This --;

line 25, change "37" to -- 35 --;

line 26, after "36", insert -- , both connected to tee section 18 in any suitable manner -- before the period.

Col. 3, line 2, change "stiffener" to -- wing --;

line 14, after "18", insert -- , including the usual fillets, --.

Signed and Sealed this

Tenth Day of May 1977

[SEAL]

Attest:

RUTH C. MASON
*Attesting Officer*

C. MARSHALL DANN
*Commissioner of Patents and Trademarks*